United States Patent [19]

Tulacs et al.

[11] 4,220,744
[45] Sep. 2, 1980

[54] MASS POLYMERIZATION PROCESS

[75] Inventors: Laszlo Tulacs; Hans Hiden, both of Graz, Austria

[73] Assignee: Vianova Kunstharz, A.G., Werndorf, Austria

[21] Appl. No.: 957,855

[22] Filed: Nov. 6, 1978

[30] Foreign Application Priority Data

Nov. 17, 1977 [AT] Austria ............................... 8196/77

[51] Int. Cl.$^2$ ........................................... C08F 218/16
[52] U.S. Cl. ....................................... 526/86; 526/87; 526/320; 526/325
[58] Field of Search ........................... 526/87, 325, 86

[56] References Cited

U.S. PATENT DOCUMENTS

| 2,298,039 | 10/1942 | D'Alelio | 526/325 |
| 2,544,692 | 3/1951 | Kugler et al. | 526/325 |
| 2,642,414 | 6/1953 | Bauer et al. | 526/325 |

Primary Examiner—Harry Wong, Jr.
Attorney, Agent, or Firm—A. W. Breiner

[57] ABSTRACT

A process for the preparation of polymers by free-radical, bulk polymerization comprising charging a reaction vessel with from about 5 to 15 percent by weight of an alpha, beta-unsaturated monomer which does not, under the conditions of the reaction, undergo free-radical polymerization, e.g., an alkyl ester of fumaric or maleic acid; thereafter adding to the reaction vessel from about 95 to 85 percent by weight of an acrylic monomer which, under the conditions of the reaction, undergoes free-radical polymerization in bulk form, blended with a free-radical initiator and controlling said addition in order that the acrylic monomer is present in said reaction kettle in an amount of less than about 20 percent, and preferably less than about 5 percent, during the course of the reaction. The process proceeds without excessive exothermy, permitting the complete polymerization in a synthetic resin reactor.

6 Claims, No Drawings

MASS POLYMERIZATION PROCESS

The present invention is directed to a process for producing polymers by free-radical, bulk polymerization. More particularly, the invention is directed to a process for producing polymers by free-radical, bulk polymerization which permits control of the polymerization heat developed during the course of the polymerization.

Polymerization in bulk is widely practiced in the manufacture of condensation polymers where the reactions are only mildly exothermic; and where most of the reaction occurs when the viscosity of the mixture is still low enough to allow ready mixing, heat-transfer, and bubble elimination. Bulk polymerization of vinyl monomers which undergo polymerization by freeradical polymerization, however, is difficult in that the reactions with the usual free-radical initiators are highly exothermic and proceed at a rate which is strongly dependent on temperature. This, coupled with the problem in heat-transfer incurred because of viscosity increases early in the reaction, leads to difficulty in control and a tendency to the development of localized "hot spots" and "runaways." Accordingly, bulk polymerization of acrylic monomers is not normally utilized except by the bulk pre-polymerization of the monomers to a conversion rate of from about 10 to 20 percent, followed by cooling of the prepolymer prior to onset of a strong exotherm which makes it impossible to interrupt the reaction. The prepolymer is then finally polymerized in thin layers in suitable molds or vessels.

Accordingly, a primary object of the present invention is to provide a process which permits the mass, bulk, or substance polymerization of acrylic monomers, such as acrylate monomers containing from 4 to 10 carbon atoms in the alkyl chain, which are useful as "organic glass," as lubricants or additives for lubricants, or as wetting agents or flow agents for powder coatings.

It is another object of the invention to provide a bulk or mass polymerization process for acrylic monomers which allows excellent control of the polymerization heat developed during the course of the polymerization, and which can be carried out completely in standard reactors, eliminating the need for final polymerization in molds.

According to the present invention, bulk polymerization of acrylic monomers which undergo free-radical polymerization is accomplished by carrying out the polymerization in the presence of minor quantities of alpha, beta-unsaturated monomers which are not homopolymerized by free-radical polymerization at the conditions of the reaction. The mass free-radical polymerization due to the excellent control of the polymerization heat developed during the polymerization reaction can be carried out in normal synthetic resin reactors, i.e., reactors conventionally employed in solution polymerization of freeradical initiated polymerization.

According to the present invention, 5-15% by weight of one or more alpha,beta-unsaturated monomers not tending to the formation of homopolymers through free-radical polymerization, preferably fumaric acid and/or maleic acid ($C_4$-$C_{12}$) alkyl esters are charged to a reaction vessel and at from 80° to 140° C.

85-95% by weight of one or more acrylic monomers, blended with a free-radical initiator are added in a controlled manner whereby the portion of free-acrylic monomers in the reaction vessel is below 20 percent, and preferably below 5 percent at any time during the reaction.

The polymers can be prepared in any resin reactor suitable for manufacturing solution polymers. Such reactors normally are stainless steel vessels with a content of up to 30 $m^3$ or more which are heated electrically or with pressurized steam and which are equipped with an effective cooling system, agitator and devices for adding monomers, additives and inert gas.

The control of the reaction with regard to content of free homopolymerizable monomer is effected through continued determination of the density and/or the refractive index. The reaction is started in known manner with free-radical initiators such as peroxides or azobisisobutyronitrile. Chain-transfer agents normally are not needed.

The primary charge is the polymerizable alpha,beta-unsaturated compounds which have a low or no tendency to homopolymerization when used alone. In the course of the reaction they are integrated into the polymer structure in order that at the end of the reaction a conversion of at least 96 percent is attained. For this purpose, dialkylesters of alpha,beta-unsaturated dicarboxylic acids are particularly suited, the alkyl radicals of which contain at least 4 carbon atoms. With alkyl radicals having more than 12 carbon atoms, the necessary quantities in most cases influence the properties of the end polymer. The diesters of fumaric acid or maleic acid are particularly suited, especially dibutylfumarate, diisobutylfumarate, dibutylmaleate, and dioctylmaleate.

For the preparation of bulk polymers which are used, f.i., in lubricants or wetting agents or as plasticizers or flow agents, especially in powder paints, monomers are preferably used wherein the homopolymers of the monomers have glass transition temperatures (Tg) of −40° C. or less. These include isobutylacrylate (Tg=−40° C.), 2-hydroxybutylacrylate (Tg=−49° C.), n-butylacrylate (Tg=−54° C.), laurylmethacrylate (Tg=−65° C.), n-decylmethacrylate (Tg=−60° C.), n-octylacrylate (−80° C.), and 2-ethylhexylacrylate (−70° C.). The butyl esters and the octyl esters (2-ethylhexylesters) of (meth)acrylic acid are particularly preferred for this purpose. For the use in powder coating compositions the products of the invention are processed according to the masterbatch process, which means that a blend is prepared from a powder coating resin and a higher level of, for instance, the flow agent, which blend is added to the coating composition. In this way, a more effective distribution of the active substance is attained.

The following examples illustrate the invention without limiting the scope thereof. All parts are by weight.

EXAMPLE 1

In a reactor equipped with agitator, inert gas supply, heating and cooling devices and addition funnel 10 parts of diisobutyl fumarate are charged and heated to 100° C. under an inert gas blanket. Thereafter, within 9 hours, 90 parts of n-butylacrylate in mixture with 2.5 parts of azobisisobutyronitrile are added continuously.

The conversion is checked by determining the refractive index. An enrichment of acrylic monomers in the reactor above 20 percent is avoided. One hour after the end of the addition, the formed polymer has a conversion rate of 97.8 percent and an intrinsic viscosity of 37.1 ml/g, measured in chloroform, at 1 percent concentration.

EXAMPLE 2

In a reactor equipped with agitator, inert gas supply, heating and cooling devices and addition funnel 12 parts of di-n-octylmaleate are charged and heated to 135° C. under an inert gas blanket. Thereafter, within 9 hours, 88 parts of 2-ethylhexylacrylate in mixture with 1.08 parts of azobisisobutyronitrile are added continuously. The conversion is checked by determining the refractive index as in Example 1. Two hours after the end of the addition, the formed polymer has a conversion rate of 99 percent and an intrinsic viscosity of 8.4 ml/g, measured in chloroform, at 1.5 percent concentration.

Various modifications can be made in the above examples. Thus, the ratio of alpha,beta-unsaturated monomer can be varied within the limits hereinbefore set. Additionally, different alpha,beta-unsaturated monomers and acrylic monomers can be employed including to provide for the production of copolymers. Such modifications, as others, being within the ability of one skilled in the art are within the scope of the present invention and appended claims.

It is claimed:

1. A process for the bulk polymerization of acrylic monomers by free-radical polymerization comprising the steps of
   (1) charging to a reaction vessel from about 5 to 15 percent by weight of an alpha,beta-unsaturated monomer which does not, under the conditions of the reaction, tend to the formation of homopolymers through free-radical polymerization and which is selected from the group consisting of fumaric acid and maleic acid alkyl esters having from 4 to 12 carbon atoms in the ester chain, and mixtures thereof;
   (2) after step (1), adding to the reaction vessel about 95 to 85 percent by weight of an acrylic monomer which, under the conditions of the reaction, undergo free-radical polymerization blended with a free-radical initiator; and
   (3) controlling addition step (2) in order that the acrylic component in the reaction kettle is present in the form of unreacted momomers in an amount of less than about 20 percent by weight during the course of the reaction.

2. The process of claim 1 wherein the reaction temperature during the addition of the acrylic monomer is maintained between about 80° and 140° C.

3. The process of claim 1 wherein the acrylic monomer is an acrylate having from 4 to 12 carbon atoms in the alkyl ester chain.

4. The process of claim 1 wherein the acrylic monomer is a monomer wherein the homopolymer of the monomer has a glass transition temperature of −40° C. or below.

5. The process of claim 4 wherein the acrylic monomer is the butyl or octyl ester of (meth)acrylic acid.

6. The process of claim 1 wherein the polymerization conversion of the acrylic monomer component is monitored by continued determinations of the refractive index.

* * * * *